Jan. 14, 1958     D. VAN DINCKLAGE     2,819,468

DETACHABLE SUNSHIELD FOR EYE GLASSES

Filed March 30, 1956

INVENTOR.
DIEDERIK VAN DINCKLAGE
BY
McMorrow, Berman & Davidson
ATTORNEYS

United States Patent Office 2,819,468
Patented Jan. 14, 1958

2,819,468

DETACHABLE SUNSHIELD FOR EYE GLASSES

Diederik Van Dincklage, Olivos, Argentina

Application March 30, 1956, Serial No. 575,245

4 Claims. (Cl. 2—13)

When in the sun, one often has difficulty in shading his or her eyes from the rays of the sun. This is particularly true when the sun is low on the horizon, and the annoyance persists even when sunglasses are being worn.

In view of the above, the present invention comprises a sun shade for eye glasses, with the sun shade being adapted to be associated either with ordinary spectacles or eye glasses, or, alternatively, sun glasses, the type of glasses being relatively immaterial to successful operation of the invention.

A more specific object is to provide a sun shade of the type referred to that will be adapted to be removably associated with the eye glasses, so that it can be removed or applied whenever desired.

Another object is to permit the removal or application of the sun shade to be carried out with minimum difficulty or loss of time.

Still another object is to provide a removable sun shade of the type referred to that will be so shaped as to be particularly effective in use, to properly shield the eyes of the user.

Summarized briefly, the invention comprises a visor, which when mounted upon the eye glasses projects forwardly therefrom substantially in a horizontal plane, the visor extending at its end over both lens frames to properly shield the user's eyes. To one longitudinal edge of the visor, intermediate opposite ends thereof, there is attached a channeled bar, adapted to slide onto a supporting strip carried by the eye glasses and extending between the upper portions of the lens frames thereof. The supporting strip is of resilient, spring metal material, with one end being anchored to one of the lens frames and the other end being tensioned to normally extend into engagement with the other lens frame. The free end of the strip may be raised slightly to permit the application or removal of the channeled bar, to facilitate the mounting of the visor upon the eye glasses or, alternatively, the removal of said visor. The visor is itself resiliently tensioned so that the opposite end portions thereof bear against the lens frames, beyond opposite ends of the supporting strip, thus holding the visor and its associated, channeled bar against movement from the proper position thereof upon the eye glasses when the visor is in use. The bar, when engaged with the strip, is adapted to be held against rotatable movement, thus supporting the visor in the mentioned, substantially horizontal plane.

Among important objects of the invention are to provide a device of the type referred to which can be associated with the glasses or readily removed therefrom, as desired; to provide a sun shade attachment that can be so applied or removed with minimum difficulty; to so design the attachment as to cause the same to be fully efficient in use; and to permit manufacture of the device at a relatively low cost considering the benefits to be obtained from the use thereof.

Other objects will appear from the following description, the claims appended thereto, and from the annexed drawing, in which like reference characters designate like parts throughout the several views, and wherein:

Figure 1:
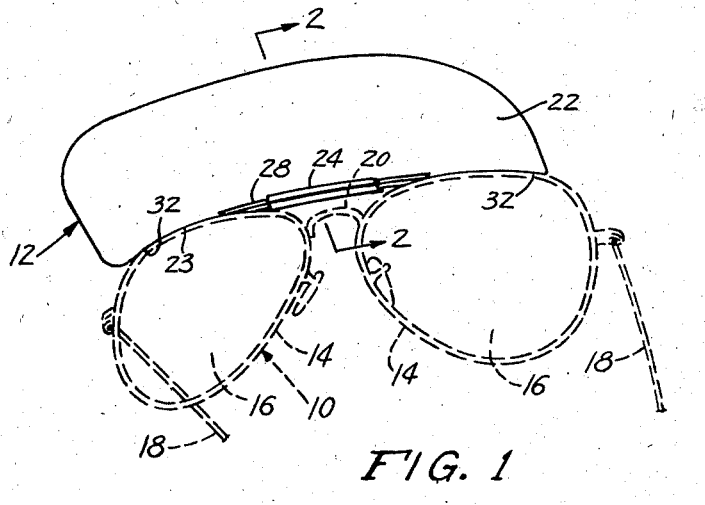
Figure 1 is a perspective view of the sun shade in use, a pair of eye glasses to which the sun shade is attached being illustrated fragmentarily and in dotted lines.

Referring to the drawings in detail, designated generally at 10 is a pair of eye glasses, which can be sun glasses or, alternatively, ordinary spectacles. The glasses are basically conventional in form, including lens frame 14 in which are mounted lenses 16. Hingedly connected to the outer sides of the lens frames are temples 18, and connected between the inner sides of the lens frames is a bridge 20.

The sun shade constituting the present invention has been generally designated at 12, and includes an elongated, relatively wide visor 22 formed of a thin, opaque or semi-opaque material such as sheet plastic, though other materials can be used provided they have the desired characteristics of relative imperviousness to the rays of the sun and resilient flexibility.

The visor body can be of any desired outer configuration, and preferably is shaped with rounded outer corners as shown in Figure 1, the body being of a length such as to extend substantially the full distance between the outer sides of the lens frames 14.

The inner longitudinal edge 23 of the visor body is, in a preferred embodiment, arcuately indented over its full length, so that the end portions of said body will overlie the tops of the lens frames 14.

Secured fixedly to the inner longitudinal edge portion of the visor 22, that is, said edge portion that overlies the lens frames 14, is an elongated, straight, downwardly facing channel member 24 (Figure 2), the depending side walls of which are formed, along their bottom, free longitudinal edges, with inwardly turned, inclined, longitudinally extending lips 26. The channel member opens at both ends, to receive a supporting strip 28, which strip is of rectangular or other non-circular cross section. Supporting strip 28 is of spring material, and at one end is fixedly secured by solder 30 or any other suitable means to one of the lens frames 14.

The other end of the support strip 28 is free of connections to the other lens frame 14, and may be supported upon a protrusion 31 provided upon said other lens frame 14. However, the protrusion 31 can be omitted if desired, it being mainly important that the strip 28 be so tensioned as to cause the free end thereof to normally bear against the frame 14 immediately below the same.

Figure 2:
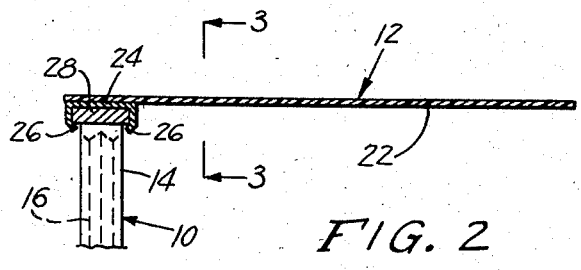
Figure 2 is an enlarged transverse sectional view on line 2—2 of Figure 1 in which the eye glasses have been shown fragmentarily in full lines.
Figure 3:
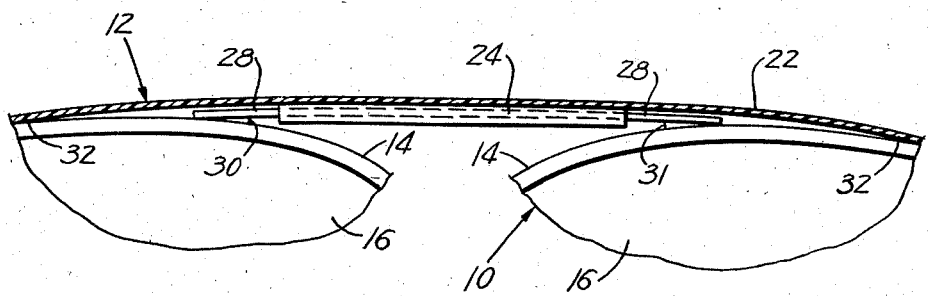
Figure 3 is a sectional view, on the same scale as Figure 2 taken on line 3—3 of Figure 2.

In use of the device, the free end of the support strip is elevated slightly, to permit the same to receive the channel member 24. The channel member is shifted longitudinally of the strip 28, to a location intermediate opposite ends of the strip, and due to the mating cross sectional shapes of the strip and channel member, the channel member is held against rotation, thus supporting the visor 22 in a position in which it projects forwardly from the eye glasses, substantially in a horizontal plane as shown in Figure 2.

The visor body is so designed as to hold the visor body and its associated channel member 24 against movement longitudinally of the support strip 28 from the assigned position of the visor and channel member. To this end, the opposite end portions of the visor body are curved downwardly, and due to the springable material of which the visor is formed, said downwardly turned end portions bear resiliently, yieldably, against the top surfaces of the lens frames 14, at locations beyond the opposite ends of the support strip 28, said locations being designated at 32.

The resilient pressure of the ends of the visor against the lens frames serves to frictionally interengage the visor with the lens frames, so that the visor and channel member will be held against movement from the assigned position thereof upon the support strip 28.

It will be readily apparent that the visor can be swiftly attached to or detached from the eye glasses in the manner described above, so that the sun shade can be used whenever desired, and can be swiftly removed if the need for same does not appear. Still further, the sun shade does not interfere with normal use of the eye glasses, and is characterized by the ease with which it can be applied to or removed from the eye glasses, as well as by its simplicity of construction, permitting its manufacture at a minimum of cost.

It is believed clear that the invention is not necesarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. The combination, with a pair of eye glasses having spaced lens frames, of a sun shade comprising a visor; a support strip of spring material connected at one end to one of the lens frames, said strip having its other end free and being tensioned to normally engage the other lens frame at said free end; and a channel member on the visor receiving said strip, said channel member being open at both ends for sliding of the same onto and off of the free end of the strip, said channel member and strip having mating, non-circular cross sectional shapes, to hold the same against relative rotation, the visor projecting forwardly from the lens frames in a substantially horizontal plane in the interengaged relationship of the strip and channel member, said channel member opening downwardly and the visor overlying and being secured at its underside to the top surface of the channel member for sliding of the channel member onto and off of the support strip without interference between the visor, channel member and said other lens frame.

2. The combination, with a pair of eye glasses having spaced lens frames, of a sun shade comprising a visor; a support strip of spring material connected at one end to one of the lens frames, said strip having its other end free and being tensioned to normally engage the other lens frame at said free end; and a channel member on the visor receiving said strip, said channel member being open at both ends for sliding of the same onto and off of the free end of the strip, said channel member and strip having mating, non-circular cross sectional shapes, to hold the same against relative rotation, the visor projecting forwardly from the lens frames in a substantially horizontal plane in the interengaged relationship of the strip and channel member, said visor at its opposite ends being resiliently tensioned into engagement with the respective lens frames beyond opposite ends of the strip, to hold the visor and channel member against movement longitudinally of the strip.

3. The combination, with a pair of eye glasses having spaced lens frames, of a sun shade comprising a visor; a support strip of spring material connected at one end to one of the lens frames, said strip having its other end free and being tensioned to normally engage the other lens frame at said free end; and a channel member on the visor receiving said strip, said channel member being open at both ends for sliding of the same onto and off of the free end of the strip, said channel member and strip having mating, non-circular cross sectional shapes, to hold the same against relative rotation, the visor projecting forwardly from the lens frames in a substantially horizontal plane in the interengaged relationship of the strip and channel member, said visor at its opposite ends being resiliently tensioned into engagement with the respective lens frames beyond opposite ends of the strip, to hold the visor and channel member against movement longitudinally of the strip, the visor being slightly curved in a longitudinal direction and being rigidly secured medially between its ends to the top surface of the channel member, the ends of the visor turning downwardly owing to the slight curvature of the visor to effect the resiliently tensioned engagement of said ends of the visor with the respective lens frames.

4. The combination, with a pair of eye glasses having spaced lens frames, of a sun shade comprising a visor; a support strip of spring material connected at one end to one of the lens frames, said strip having its other end free and being tensioned to normally engage the other lens frame at said free end; and a channel member on the visor receiving said strip, said channel member being open at both ends for sliding of the same onto and off of the free end of the strip, said channel member and strip having mating, non-circular cross sectional shapes, to hold the same against relative rotation, the visor projecting forwardly from the lens frames in a substantially horizontal plane in the interengaged relationship of the strip and channel member, said visor at its opposite ends being resiliently tensioned into engagement with the respective lens frames beyond opposite ends of the strip, to hold the visor and channel member against movement longitudinally of the strip, the visor being slightly curved in a longitudinal direction and being rigidly secured medially between its ends to the top surface of the channel member, the ends of the visor turning downwardly owing to the slight curvature of the visor to effect the resiliently tensioned engagement of said ends of the visor with the respective lens frames, said ends of the visor being tensioned in a direction to exert their spring force against the lens frames in paths approximately normal to the path of movement of the channel member when being slid onto an off of the support strip.

References Cited in the file of this patent

UNITED STATES PATENTS

| 2,507,474 | Lindblom | May 9, 1950 |
| 2,640,195 | Bricker | June 2, 1953 |
| 2,696,141 | Hurst | Dec. 7, 1954 |